US012204222B2

(12) United States Patent
Soto et al.

(10) Patent No.: US 12,204,222 B2
(45) Date of Patent: Jan. 21, 2025

(54) HYBRID VARIABLE TRANSMISSION OPTICAL DEVICE

(71) Applicant: ALPHAMICRON INCORPORATED, Kent, OH (US)

(72) Inventors: Pedro Soto, Kent, OH (US); Ludmila Sukhomlinova, Kent, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 18/429,489

(22) Filed: Feb. 1, 2024

(65) Prior Publication Data
US 2024/0219793 A1 Jul. 4, 2024

Related U.S. Application Data

(63) Continuation-in-part of application No. PCT/US2022/039226, filed on Aug. 3, 2022.

(60) Provisional application No. 63/228,797, filed on Aug. 3, 2021.

(51) Int. Cl.
*G02F 1/1335* (2006.01)
*G02F 1/137* (2006.01)

(52) U.S. Cl.
CPC ...... *G02F 1/13725* (2013.01); *G02F 1/13706* (2021.01); *G02F 1/13712* (2021.01); *G02F 2202/043* (2013.01); *G02F 2202/14* (2013.01)

(58) Field of Classification Search
CPC .................................................. G02F 1/13712
See application file for complete search history.

(56) References Cited

U.S. PATENT DOCUMENTS

| | | | |
|---|---|---|---|
| 5,943,104 A | 8/1999 | Moddel et al. | |
| 6,999,220 B2 | 2/2006 | Kosa et al. | |
| 7,102,602 B2 | 9/2006 | Kim et al. | |
| 7,567,306 B2 | 7/2009 | Park et al. | |
| (Continued) | | | |

FOREIGN PATENT DOCUMENTS

WO   2022047371 A1   3/2022

OTHER PUBLICATIONS

International Search Report & Written Opinion received for International Application No. PCT/US2022/039226 received on Nov. 1, 2022, 17 pages.

*Primary Examiner* — Sang V Nguyen
(74) *Attorney, Agent, or Firm* — Alavi IP

(57) ABSTRACT

A variable transmission optical device includes a cell having d/p ratio of greater than 0.01. The cell includes a pair of substrates each having an electrically conductive layer and a guest-host mixture having both photochromic and dichroic properties provided between the substrates. The cell may be switched between at least three states including: a first state having a first optical transmission when the optical device is not exposed to UV radiation and no voltage is applied to the cell; a second state having a second optical transmission different from the first optical transmission when the optical device is exposed to UV radiation and no voltage is applied to the cell; and a third state having a third optical transmission different from the first or second optical transmission when the optical device is exposed to UV radiation and a voltage is applied to the cell.

23 Claims, 14 Drawing Sheets

(56) References Cited

U.S. PATENT DOCUMENTS

| | | |
|---|---|---|
| 7,811,482 B2 | 10/2010 | Miller et al. |
| 8,016,415 B2 | 9/2011 | Figler et al. |
| 8,562,130 B2 | 10/2013 | Kosa et al. |
| 8,736,805 B2 | 5/2014 | Borenstein et al. |
| 9,034,457 B2 | 5/2015 | Su et al. |
| 9,102,652 B2 | 8/2015 | Sukhomlinova et al. |
| 9,130,097 B2 | 9/2015 | Taheri et al. |
| 9,134,551 B2 | 9/2015 | Sukhomlinova et al. |
| 9,200,203 B2 | 12/2015 | Sukhomlinova et al. |
| 9,303,209 B2 | 4/2016 | Munoz et al. |
| 9,304,333 B2 | 4/2016 | Taheri |
| 9,869,887 B2 | 1/2018 | Taheri et al. |
| 9,918,508 B2 | 3/2018 | Ryan et al. |
| 10,095,052 B2 | 10/2018 | Bhatta et al. |
| 10,310,349 B2 | 6/2019 | Taheri et al. |
| 10,401,690 B2 | 9/2019 | Baker et al. |
| 10,914,991 B2 | 2/2021 | Miller, IV et al. |
| 11,194,208 B2 | 12/2021 | Soto et al. |
| 11,435,610 B2 | 9/2022 | Miller, IV et al. |
| 11,500,255 B2 | 11/2022 | Taheri et al. |
| 2008/0246900 A1 | 10/2008 | Taheri et al. |
| 2011/0283431 A1* | 11/2011 | Miller, IV .............. G02C 7/101 2/10 |
| 2012/0257123 A1 | 10/2012 | Lee |
| 2013/0258266 A1* | 10/2013 | Sukhomlinova ..... C09K 19/601 252/299.01 |
| 2014/0226096 A1 | 8/2014 | Taheri et al. |
| 2016/0070132 A1* | 3/2016 | Soto .................... G02F 1/13725 349/193 |
| 2017/0276960 A1 | 9/2017 | Osterman et al. |
| 2019/0306386 A1 | 10/2019 | Akkaya et al. |
| 2024/0004245 A1* | 1/2024 | Munoz ................ G02F 1/13718 |

\* cited by examiner

HYBRID VARIABLE TRANSMISSION OPTICAL DEVICE

CROSS-REFERENCE TO RELATED APPLICATIONS

This application is a Continuation-in-Part of PCT/US22/39226, filed on Aug. 3, 2022, which claims priority to, and any other benefit of, U.S. Provisional Patent Application Ser. No. 63/228,797, entitled HYBRID VARIABLE TRANSMISSION OPTICAL DEVICE, filed Aug. 3, 2021, the entire disclosure of which is fully incorporated herein by reference.

TECHNICAL FIELD

The present disclosure relates to optical devices, particularly variable transmissive optical devices that may be reversibly switched between clear and darkened states.

BACKGROUND

There is an ever-present desire for transmissive optical devices to adapt to different light conditions. Such optical devices may include, e.g., eyewear, visors, goggles, windows, windshields, VR/AR glasses, or generally any optical device where modulation of transmitted light may be useful. Photochromic lenses are commonly used and have the ability to change a lens from clear to dark when exposed to UV light, but they are slow to respond to light. A photochromic dye's recovery time (the time it takes the dye to revert from an absorptive condition to a clear condition) can sometimes take 5 to 15 minutes, which is often undesirably long.

Another issue of photochromic dyes is that they generally require UV light to be activated, and so have limited functionality in bright light that does not have a UV component. For example, the photochromic dye may not sufficiently activate in rooms with bright indoor lighting or behind a window or windshield having a UV-absorbing coating (UV coatings on car windshields are quite common).

Electronically switchable solutions exist and are typically much faster-acting than photochromic devices. For example, some electronically switchable systems may use a guest-host mixture of a dichroic dye (guest) and a liquid crystal (host) that can switch between a maximum transmission and a minimum transmission in a matter of only seconds or milliseconds. Further, the level of light transmission in some cases may be continuously variable between maximum and minimum transmissions based on voltage applied. However, compared to photochromic dye systems, these electronic devices often have less "transmission swing", i.e., the difference between maximum and minimum transmission states. Electronically switchable systems also require power to operate and do not function if the battery is depleted. Thus, there is a continuing need to further improve variable transmission optical devices.

SUMMARY

A variable transmission optical device includes a first cell having a first pair of substrates each having an electrically conductive layer and a first guest-host mixture provided between the first pair of substrates. The first guest-host mixture includes a first chiral liquid crystal (CLC) host having d/p ratio of greater than 0 and a first dyestuff material including one or more dyes, the first dyestuff material having both photochromic and dichroic properties. The first cell may be switched between at least three states including: a first state having a first optical transmission when the optical device is not exposed to UV radiation and no voltage is applied between the first set of electrodes; a second state having a second optical transmission different from the first optical transmission when the optical device is exposed to UV radiation and no voltage is applied between the first set of electrodes; and a third state having a third optical transmission different from the first or second optical transmission when the optical device is exposed to UV radiation and a voltage is applied between the first set of electrodes.

DETAILED DESCRIPTION

Figure 1:
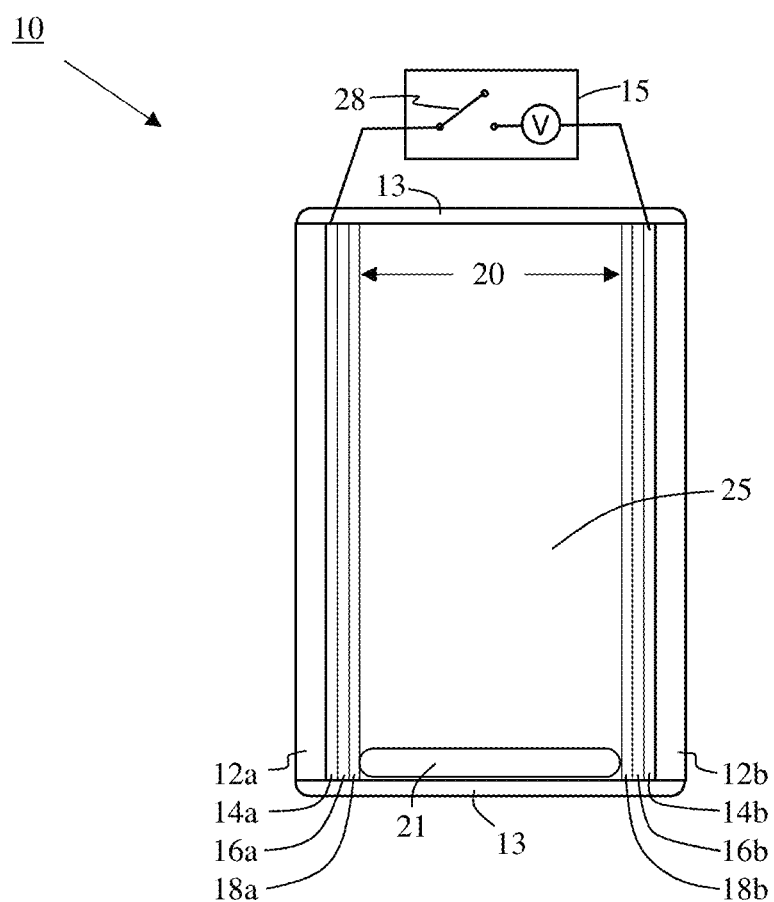
FIG. 1 is a cross-sectional view of a non-limiting example of a hybrid Variable Transmission Optical Device ("hybrid VTOD") according to some embodiments.

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. It is to be understood that the drawings are for purposes of illustrating the concepts of the disclosure and may not be to scale.

The present disclosure may include one or more of the following terms whose meanings may be as described below.

"Absorption" as used herein may define the percentage of light not transmitted through the cell or optical device. In this description, it is related to transmission by the following: absorption=100%–transmission. As used herein, "transmission" and "transmittance" are used interchangeably and mean the percentage of light that is transmitted through a device. "Absorption band" may define the spectral wavelength wherein absorption occurs. "Clear state" or "clear state transmission", as used herein, may refer to the state where the guest-host mixture exhibits maximal light transmittance.

"Dark state" or "dark state transmission" may refer to the state where the mixture exhibits minimal light transmittance.

A "Dichroic (DC) Dye" is organic molecule that has a rodlike shape and displays a unique anisotropy in which its light absorption properties occur parallel ($\alpha\parallel$) and perpendicular ($\alpha\perp$) to the molecule, this being characterized by the dichroic ratio, $DR=\alpha\parallel/\alpha\perp$. Any molecule that has a dichroic ratio (DR) is one that exhibits "dichroism".

"Dichroic ratio", "average dichroic ratio" or Dmix of the mixture ($DR=\alpha\perp/\alpha\parallel$) refers to the dichroic ratio of the guest-host mixture which may contain one or more dichroic (DC) or photochromic-dichroic (PCDC) dyes. The mixture dichroic ratio may be measured using the formula for Effective Dichroic Ratio (Deff) or Aggregate Effective Dichroic Ratio (Deff-agg). Thus, as used herein, Dmix, Deff or Deff-agg are used interchangeably (depending on which method is used to measure the dichroic ratio) and describe the same parameter.

"Guest-host mixture" refers to a mixture of a liquid crystal host and guest dyes that exhibit the guest-host effect described below. The system may have other components such as chiral dopant. In such cases chiral nematic and cholesteric are used interchangeably.

Nematic-isotropic transition temperature or TNI is the temperature at which the liquid crystal undergoes the nematic to isotropic transition, which is the transition from the orientationally ordered nematic phase to the totally disordered isotropic phase. As used herein, TNI refers to the nematic-isotropic transition temperature of the mixture.

"Order parameter of the guest-host mixture" or "Smix" refers to the order parameter of the guest-host mixture. The mixture may contain one or more dyes as well as other dopants. The Smix can be measured according to the method described herein, e.g., using the formula for Effective Order Parameter (Seff) or Aggregate Effective Order Parameter (Seff-agg). As used herein Smix, Seff and Seff-agg are used interchangeably (depending on which method is used to measure the order parameter) and describe the same parameter.

"Photochromism" or "photochromic property" are used interchangeably and refer to reversible transformation of a chemical species (photoswitch) between two forms by the absorption of electromagnetic radiation, where the two forms have different absorption spectra. In other words, it is a reversible change of color upon exposure to light.

"Photochromic dye" refers to a dye or dyestuff having photochromism. This means their apparent color (the amount of light they absorb at a particular wavelength or wavelengths) reversibly changes in response to the intensity of light with which they are illuminated. Typically, the photochromic reaction is in response to ultraviolet illumination, while the enhanced absorption is at visible wavelengths. These devices rely on a reversible photo induced chemical reaction in which a dye molecule absorbs ultraviolet photons, changes either chemically or conformationally, and the reaction product has an altered absorption characteristic of visible light.

A "Photochromic-Dichroic (PCDC) dye" refers to a photochromic dye that when activated, exhibits dichroism in a visible region of the spectrum. A PCDC dye has both photochromic and dichroic properties.

"Polarization dependence" is a measure of a material's response to two orthogonal linear polarizations; i.e. where the optical properties of a material experienced by an incident light (such as index of refraction or absorption/transmittance) are dependent on the polarization of the incident light.

"Polarization sensitivity" is the relative measure of the response of the material between the two orthogonal linear polarizations. In ideal, theoretical limit, zero percent (0%) polarization sensitivity refers to a completely polarization insensitive device and a 100% polarization sensitivity refers to a completely polarization sensitive device as obtained using a polarizer.

"Polarizer" refers to a material that absorbs or reflects one polarization of incident light more than the orthogonal polarization.

"Transmission swing" refers to the difference in transmission between the clear state and dark state transmissions. For example, if the clear state transmission is 65% and the dark state transmission is 15%, the transmission swing is 65-15=40%. The transmission swing of an optical device can be measured using equipment such as a "haze-gard plus" device from BYK-Gardner, USA, or equivalent.

"Uniform optical retardation" refers to plastic substrates having an optical retardation variation that is less than ±20%. "Optical retardation" is defined as the change in the optical phase experienced by different polarizations of incident light.

"Visible light" refers to a wavelength range of about 400 to about 700 nm.

"Wide band absorption" as used herein, may refer to a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm.

"Wide Band Device" refers to a device that exhibits a wide absorption band, and a wide (i.e. >30%) transmission swing with polarization sensitivity of less than 50%, or in some examples less than 40%, 30%, 20%, 15%, or in some examples less than 10%.

"Wide Band Mixture" refers to a guest-host liquid crystal mixture that can be used in a wide band device.

Optical Device Overview

FIG. 1 is a cross-sectional view of a non-limiting example of a hybrid Variable

Transmission Optical Device ("hybrid VTOD") according to some embodiments. In some embodiments, the hybrid VTOD 10 may include a pair of substrates, 12*a*, 12*b*, separated by a gap defining a cell thickness 20. To aid in maintaining the separation, optional spacers (not shown), such as glass or plastic rods or beads, may be inserted between substrates 12*a* and 12*b*. As described in more detail later, an optically active liquid crystal guest-host mixture 25 is disposed between the substrates. In some cases, the structure may be enclosed by a sealing material 13 (or 21), such as a UV-cured optical adhesive or other sealants known in the art. In some embodiments, the substrates may include a polymeric material, a glass, or a ceramic. Substrates 12*a*, 12*b* may each include transparent conducting layer 14*a*, 14*b* provided over the respective substrate. Both conducting layers 14*a* and 14*b* may be connected to a power circuit 15. The power circuit 15 may include a variable voltage supply which is represented schematically by the encircled V. FIG. 1 shows the power circuit 15 with its switch 28 open so that no voltage is applied. When switch 28 is closed, a variable voltage or electric field may be applied across liquid crystal guest-host mixture 25. In some embodiments, an optional passivation layer (which in some cases may be referred to as an insulating layer or "hard coat"), 16a, 16b, may be provided over the respective conducting layer. The passivation layer may include, for example, a non-conductive oxide, sol-gel, polymer, or a composite. An alignment layer 18a, 18b, may be provided over the passivation layer or the electrically conductive layer. As a non-limiting example, the alignment layer may include polyimide. In some embodiments, the alignment layer may function as a passivation layer. The alignment layer may be the innermost layer of the substrate and may be in contact with the liquid crystal guest-host mixture 25. Note that any or all of parts 12a, 14a, 16a, and 18a may be the same or different relative to the corresponding parts on the opposite side of the cell 12b, 14b, 16b, and 18b. In some embodiments, a hybrid VTOD may be constructed so that it acts as a "wide band device".

Guest-Host Mixture

A guest-host effect is an electro-optical effect that involves a mixture of dichroic dye "guest" and liquid crystal "host" wherein the dichroism may be adjusted within a voltage-controllable liquid crystal cell. In an isotropic host, the molecules are randomly oriented, and the effective absorption is a weighted average: $\alpha eff=(2\alpha\perp+\alpha\parallel)/3$. In an anisotropic LC host material, designed for polarization independent operation, the absorption can be increased to $\alpha eff=(\alpha\perp+\alpha\parallel)/2$ or $\alpha\perp$, depending on the desired effect.

In some embodiments, the liquid crystal guest-host includes a mixture of a CLC host (defined below) and a dyestuff material. The dyestuff material may be characterized as having both photochromic and dichroic properties, and as described below, may include a single dye or a mixture of dyes to provide these properties. In some embodiments, the liquid crystal guest-host mixture may be formulated as a "wide band mixture".

CLC Host

The term CLC as described here refers to a liquid crystal that has a d/p greater than 0 and includes, in various embodiments, a surface-induced twisted nematic (SITN), a chiral nematic or cholesteric liquid crystal material (all collectively "CLC") which may have a negative dielectric anisotropy ("negative CLC") or a positive dielectric anisotropy ("positive CLC"). The periodicity of the twist is referred to as its "pitch". The term SITN refers to a nematic LC that has a surface-induced pitch. In some embodiments, the CLC has a d/p greater than 0.01. The orientation or order of the liquid crystal host may be changed upon application of an electric field, and in combination with the dyestuff material, may be used to control or partially control the optical properties of the cell. In some embodiments, a surface-induced twisted nematic A wide variety of CLC materials are available and have potential utility in various embodiments of the present disclosure.

Dyestuff Material

To provide both photochromic and dichroic properties, the dyestuff material may in some embodiments include one of the following non-limiting examples of materials or mixtures:
  at least one photochromic-dichroic (PCDC) dye;
  a mixture of at least one photochromic (PC) dye and at least one dichroic (DC) dye;
  a mixture of at least one PCDC dye and at least one DC dye;
  a mixture of at least one PCDC dye and at least one PC dye;
  a mixture of at least one PCDC dye, at least one DC dye, and at least one PC dye.

PCDC Dyes

A PCDC dye, as noted above, refers to a photochromic dye that when activated, exhibits dichroism in a visible region of the spectrum. For convenience, the switched PCDC dye may be referred to as PCDC*. For example, a PCDC dye may in its first (non-exposed) or "clear" state absorb only a small amount of visible light or no visible light at all. Unless noted otherwise, "visible light" refers to a wavelength range of about 400 to about 700 nm. Upon exposure to UV radiation, the PCDC dye may switch to a second, more light absorbing or "dark" state (PCDC*). Unlike simple photochromic dyes, the PCDC dye further exhibits dichroic properties.

In some embodiments, a PCDC* dye (as measured in a CLC host) may have a dichroic ratio of at least 2.0, alternatively at least 3, 4, 5, 6, 7, 8, 9, 10, 11, 12, 13, 14, 15, 16, 17, 18, 19, or 20. Alternatively, the Order Parameters of the PCDC dyes may be 0.5, 0.6, 0.7, 0.8, 0.9 or any number in between. In some embodiments, the order parameter of the PCDC dye is between 0.5-0.8, or 0.6-0.9, or 0.75-0.87. In some examples, the PCDC dye mixture may have an order parameter of 0.70, 0.75, 0.76, 0.77, 0.78, 0.79, 0.80, 0.81, 0.82, 0.83, 0.84, 0.85, 0.86 or 0.87.

The level of visible light absorption by the PCDC* may be a function of the dye type, the CLC host, flux of UV radiation, and rate of thermal relaxation back to the first state. Thermal relaxation may also be a function of numerous variables, including but not limited to, the dye type, the CLC host, and temperature. In a hybrid VTOD cell of the present disclosure, the apparent absorption of visible light may also be a function of voltage. As mentioned, the orientation or long-range order of the CLC may be a function of electric field or voltage across the cell thickness. The dichroic nature of the PCDC* dye may allow the CLC host to induce an orientation on the PCDC* that may enhance or reduce the apparent darkness in a cell when a voltage is applied as discussed later.

In some embodiments, a PCDC dye may include a small molecule type of material. In some embodiments, a PCDC dye may include an oligomeric or polymeric material. The chemical moiety responsible for photochromism may, for example, be a pendent group on a main chain. Typically, the dichroic property is dependent on a molecule with a mesogenic group.

Multiple PCDC dyes may optionally be used, for example, to make light absorption confined to one region of the spectrum ("narrow band" or colored absorption), or, alternatively, to make light absorption "wide band" or more neutral in appearance. Dyes may also be used to improve overall cell performance with respect to lifetime, relaxation rate, or some other property. PCDC dyes may include functional groups that may improve solubility or miscibility with the CLC host. Some non-limiting examples of PCDC dye classes may include certain naphthopyran derivatives, as described in U.S. Pat. Nos. 9,249,136 and 9,102,652, the entire contents of which are incorporated by reference herein for all purposes. Other examples are known and include, e.g., those discussed in U.S. Patent Application 2005/0004361 (Kumar et al.).

PC Dyes

Photochromic or PC dyes are well-known and are dyes that transform from clear to colored by changing their chemical structure after absorbing UV light. The UV light causes the PCs to absorb color and then change back to clear when the UV source is removed. For convenience, the switched PC dye may be referred to as PC*. For example, a PC dye may in its first (non-exposed) or "clear" state absorbs only a small amount of visible light or no visible light at all. Upon exposure to UV radiation, the PC dye may switch to a second, more light absorbing "colored" or "dark" state (PC*). Unlike PCDC dyes, a PC dye, as used herein, does not exhibit substantial dichroic behavior and has an order parameter lower than that of the PCDC. In some embodiments, the PC* dye (as measured in a CLC host) may have a dichroic ratio (DR) of less than 2, less than 1 or equal to 0.

The level of visible light absorption by the PC* dye may be a function of the dye type, the flux of UV radiation, and the rate of thermal relaxation back to the first state. Thermal relaxation may also be a function of numerous variables, including but not limited to, the dye type and temperature. In a hybrid VTOD cell of the present disclosure, and unlike the PCDC* dye, the apparent absorption of visible light by the PC* dye is generally not a strong function of voltage.

For a dyestuff material to exhibit both photochromic and dichroic properties, a DC dye can be combined with a PCDC dye, a PC dye (see below), or both.

PC dyes are well known. In some embodiments, a PC dye may include a small molecule type of material. In some embodiments, a PC dye may include an oligomeric or polymeric material. The chemical moiety responsible for photochromism may, for example, be a pendent group on a main chain. Multiple PC dyes may optionally be used, for example, to limit light absorption to a specific color, or alternatively to make light absorption more neutral in appearance or to improve overall cell performance with respect to lifetime, relaxation rate, or some other property. PC dyes may include functional groups that may improve solubility or miscibility with the CLC host. Some non-limiting examples of PC dyes may include certain spiropyrans, spirooxazines, diarylethenes, naphto-pyrans, azobenzenes, photochromic quinones or other known photochromic molecules.

DC Dyes

In some embodiments, a DC dye may be designed simply to absorb visible light, without any substantial photochromic behavior. That is, unlike PCDC or PC dyes, absorption of UV radiation does not cause a significant change its light absorption property. In some embodiments, a DC dye (as measured in a CLC host) may have a dichroic ratio of at least 5.0, alternatively at least 6, 7, 8, 9, 10, 11, 12, 13, 14, 15, 16, 17, 18, 19 or 20.

The level of visible light absorption by the DC dye may be a function of the dye type and the CLC host. In a hybrid VTOD cell of the present disclosure, the apparent absorption of visible light may also be a function of voltage. As mentioned, the orientation or long-range order of the CLC may be a function of electric field or voltage across the cell thickness. A DC dye exhibits some alignment with the CLC host so that application of a voltage may be used to alter the apparent darkness of the cell.

In some embodiments, a DC dye may include a small molecule type of material. In some embodiments, a DC dye may include an oligomeric or polymeric material. The chemical moiety responsible for light absorption may, for example, be a pendent group on a main chain. Multiple DC dyes may optionally be used, for example, to make light absorption more neutral in appearance or to improve overall cell performance with respect to lifetime or some other property. DC dyes may include functional groups that may improve solubility or miscibility with the CLC host. Some non-limiting examples of DC dyes may include azo dyes, for example, azo dyes having 2-10 azo groups, or alternatively, 2-6 azo groups. Other DC dyes are known in the art, such as anthraquinone and perylene dyes. Generally, any molecule with dichroic properties can be used.

Other Cell Components

Substrate

Referring again to FIG. 1, in some embodiments, the substrates 12a and 12b may be independently selected and may be composed of a plastic, a glass, a flexible glass material, a transparent ceramic, or some other material. Choice of material and its particular properties depends in part on the intended application. For many applications, the substrate should be at least partially transmissive to visible light. In some embodiments a substrate may have higher than 45% transmission to visible radiation having a wavelength between 400 nm and 700 nm, alternatively, higher than 50%, 60%, 70%, 80%, 90%, or 95% transmission. In some embodiments, the substrate may have high optical clarity so that a person or sensor may clearly see through the hybrid VTOD. In some embodiments, the substrate may have some color or tint. In some embodiments, the substrate may have an optical coating on the outside of the cell. A substrate may be flexible or rigid.

As some non-limiting examples, a plastic substrate may include a polycarbonate (PC), a polycarbonate and copolymer blend, a polyethersulfone (PES), a polyethylene terephthalate (PET), cellulose triacetate (TAC), a polyamide, p-nitrophenylbutyrate (PNB), a polyetheretherketone (PEEK), a polyethylenenapthalate (PEN), a polyetherimide (PEI), polyarylate (PAR), a polyvinyl acetate, a cyclic olefin polymer (COP) or other similar plastics known in the art. Flexible glass include materials such as Corning® Willow® Glass and the like.

In some embodiments, the thickness of a substrate may be in a range of 10-20 µm, 20-30 µm, 30-40 µm, 40-50 µm, 50-75 µm, 75-100 µm, 100-150 µm, 150-200 µm, 200-250 µm, 250-300 µm, 300-350 µm, 350-400 µm, 400-450 µm, 450-500 µm, 500-600 µm, 600-800 µm, 800-1000 µm, or greater than 1 mm or any combination of ranges thereof.

Transparent Conducting Layer

By "transparent" conducting layer, it is meant that the conducting layer allows at least 45% of incident visible light to pass through. A transparent conducting layer may absorb or reflect a portion of visible light and still be useful. In some embodiments, the transparent conducting layer may include a transparent conducting oxide (TCO) including, but not limited to, ITO or AZO. In some embodiments, the transparent conducting layer may include a conductive polymer including, but not limited to, PEDOT:PSS, a poly(pyrrole), a polyaniline, a polyphenylene, or a poly(acetylene). In some embodiments, the transparent conducting layer may include a partially transparent thin layer of metal or metal nanowires, e.g., formed of silver, copper, aluminum, or gold. In some embodiments, the transparent conducting layer may include graphene.

Hybrid VTOD Embodiments and Properties

Positive CLC/PCDC

Figure 2A:
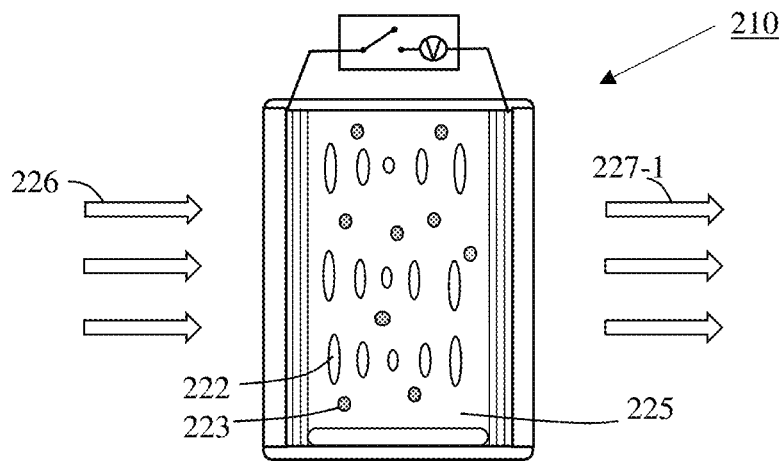
FIGS. 2A-2C are a series of cross-sectional schematics of a non-limiting example of a hybrid VTOD according to some embodiments.
Figure 2B:
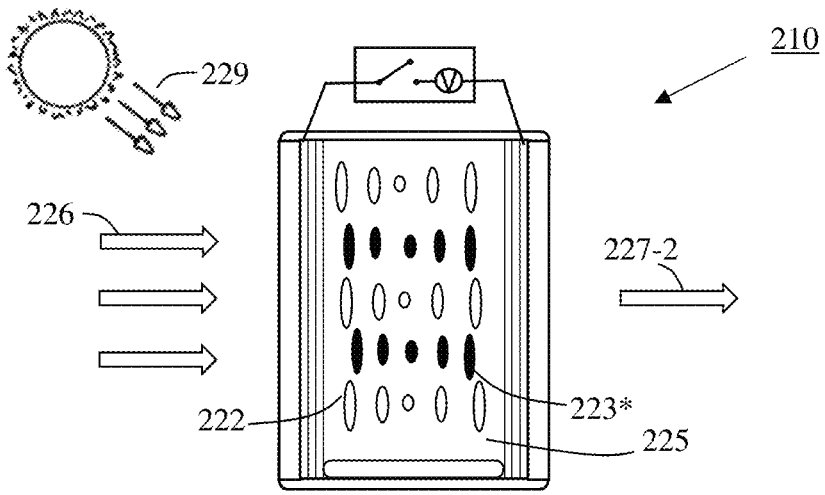
Figure 2C:
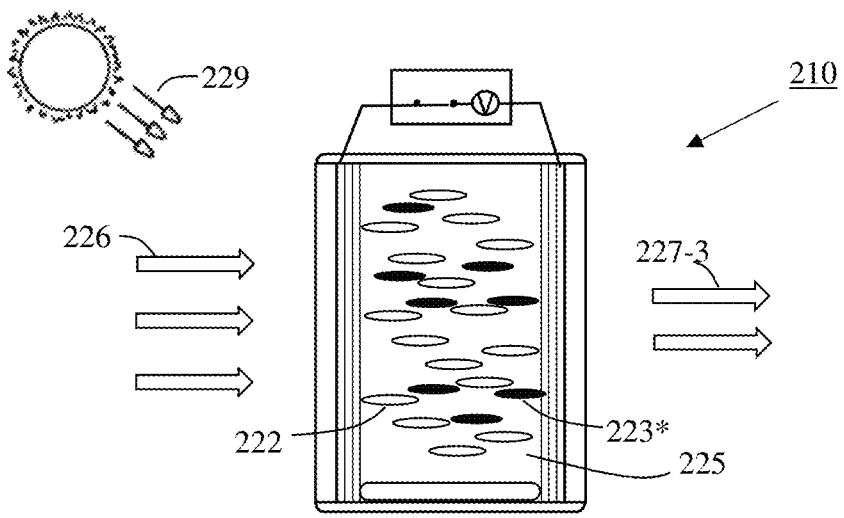

FIGS. 2A-2C are a series of cross-sectional schematics of a non-limiting example of a hybrid VTOD 210 having a guest host mixture 225 including a positive CLC host 222 and a dyestuff material that includes at least one PCDC dye 223 according to some embodiments. Hybrid VTOD 210 may be similar to the structure shown in FIG. 1. For clarity, various part numbers are not shown, but the parts are self-evident from FIG. 1. FIG. 2A illustrates the hybrid VTOD 210 in a first state where the device is not exposed to UV light nor under an applied voltage. The first state may generally correspond to the device's maximum transmissivity or clearest state. Incident visible light 226 is not strongly absorbed and most of it passes through as transmitted light 227-1 having a first optical transmission.

FIG. 2B illustrates the hybrid VTOD in a second state where the device is exposed to UV light 229 but not to a voltage. Under UV radiation, a portion of PCDC dyes 223 are converted to their darkened state, 223*. The general alignment of darkened PCDC dye 223* with the positive CLC host 222 allows the PCDC dye 223* to absorb a greater portion of the incident visible light which is passed through and attenuate the transmitted light 227-2 having a second optical transmission. The second state may generally correspond to the device's minimum transmissivity or darkest state.

FIG. 2C illustrates the hybrid VTOD in a third state where the device is exposed to UV light 229 and to a voltage above the threshold voltage sufficient to significantly reorient the CLC host 222 and the PCDC dye 223*. In this state, the PCDC dye 223* absorbs less light than in the second state. The transmitted light 227-3 (having a third optical transmission) in the device's third state has an intensity intermediate between that of the first and second states. By varying the voltage, the transmissivity may be variable (continuously or stepwise) between the second and third states. As mentioned, the thermal relaxation of a PCDC dye 223* to its less-absorbing state 223 may take several minutes. However, the reorientation of the CLC host under voltage is much faster and may, in some cases, take only milliseconds. This property may be particularly useful, for example, where the optical device is a form of eyewear. Outside, the user's eyes are protected from bright sun without the need for any power. However, when coming back inside, the user may switch on the voltage which almost instantly (e.g., within milliseconds) reduces the darkness of the eyewear to the third state, thereby improving the user's vision before waiting for the relaxation of the PCDC dye back it its low-absorbing form. When the PCDC dye has sufficiently returned to its low-absorbing state (fourth state—explained below), the user may turn off the voltage.

In the embodiments of FIG. 2, a potential fourth state may include application of a voltage without exposure to UV light for sufficient time to allow the PCDC light to return to its low-light absorbing state. However, in this embodiment, such a condition will generally not result in a significant optical change because there is no visible light absorption without UV radiation. Overall, the optical transmissivities of the various states of the present embodiment may have the following order: first optical transmission>third optical transmission>second optical transmission.

Positive CLC/PCDC & DC

Figure 3A:
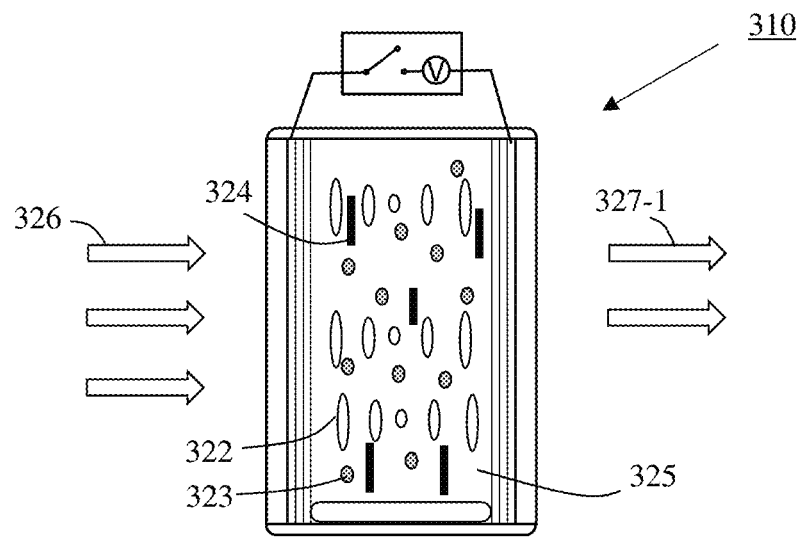
FIGS. 3A-3D are a series of cross-sectional schematics of a non-limiting example of a hybrid VTOD according to some embodiments.

FIGS. 3A-3D are a series of cross-sectional schematics of a non-limiting example of a hybrid VTOD 310 according to some embodiments. Hybrid VTOD 310 may have a guest host mixture 325 including a positive CLC host 322 and a dyestuff material that includes at least one PCDC dye 323 and at least one DC dye 324. Hybrid VTOD 310 may be similar to the structure shown in FIG. 1. For clarity, various part numbers are not shown, but the parts are self-evident from FIG. 1. FIG. 3A illustrates the hybrid VTOD 310 in a first state where the device is not exposed to UV light nor under a voltage. The DC dye 324 may be generally aligned to the CLC host such that incident visible light 326 is partially absorbed and transmitted light 327-1 has a first optical transmission that is partially attenuated. The transmissivity of the first state may depend in part on the amount of DC dye present.

Figure 3B:
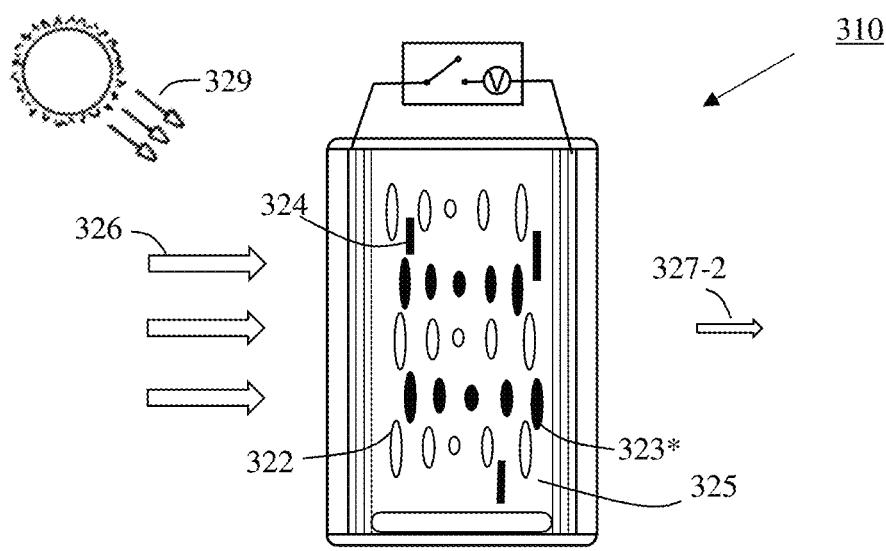

FIG. 3B illustrates the hybrid VTOD in a second state where the device is exposed to UV light 329 but not to a voltage. Under UV radiation, some of PCDC dye 323 is converted to its darkened state, 323*. The general alignment of darkened PCDC dye 323* with the positive CLC host 322 allows the PCDC dye 323* to absorb a greater portion of the incident visible light in addition to light absorbed by DC dye 324. Visible light passing through the device in the second state has attenuated transmitted light 327-2 having a second optical transmission. The second state may generally correspond to the device's minimum transmissivity or darkest state. The hybrid VTOD of this embodiment may be similar to that of FIG. 2B except with the added absorption of DC dye 324.

Figure 3C:
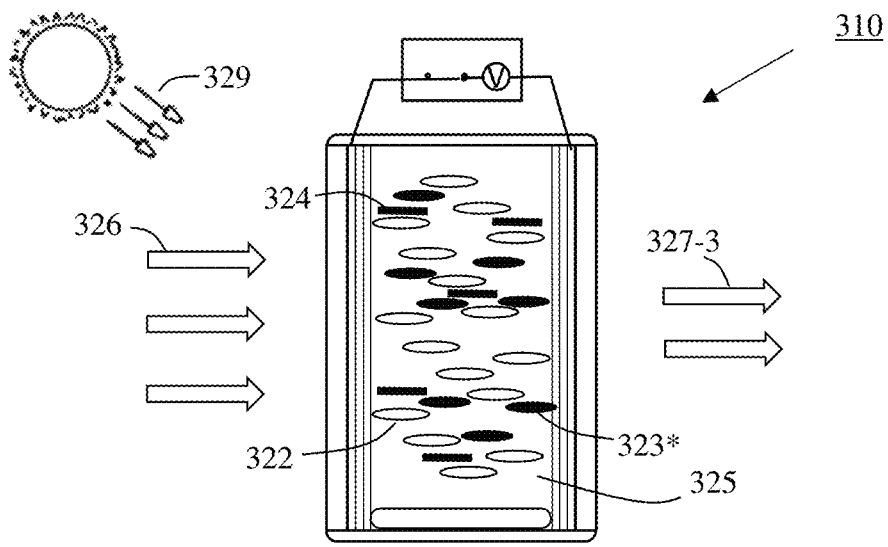

FIG. 3C illustrates the hybrid VTOD in a third state where the device is exposed to UV light 329 and to a voltage above the threshold voltage sufficient to reorient the CLC host 322, the PCDC dye 323*, and DC dye 324. In this state, the PCDC dye 323* and DC dye 324 absorb less light than in the second state. The transmitted light 327-3 may have a third optical transmission that is higher than the second state (and may or may not be higher than the first state). By varying the voltage, the transmissivity may be variable between the second and third states.

Figure 3D:
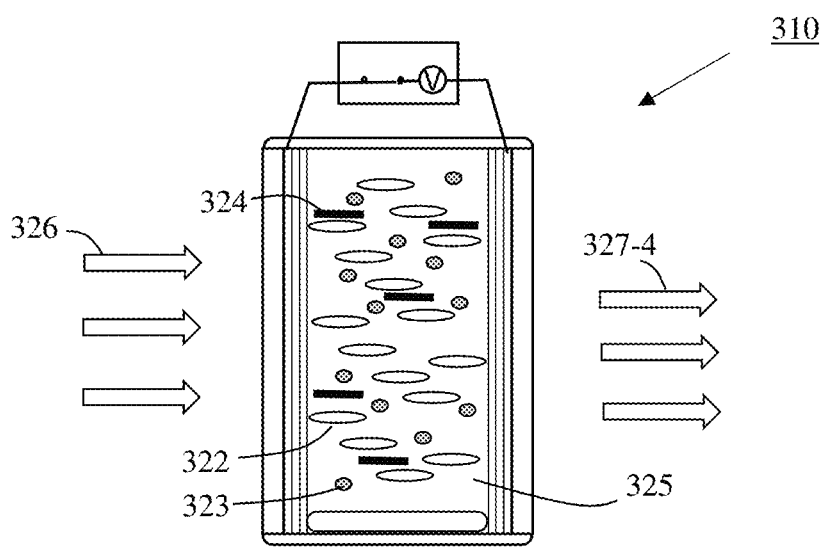

FIG. 3D illustrates the hybrid VTOD in a fourth state where the device is not exposed to UV light, but a voltage is applied above the threshold voltage sufficient to reorient the CLC host 332 and the DC dye 324. In this state, the DC dye 324 absorbs less light than in the first state. In this embodiment, the fourth state may generally correspond to the device's maximum transmissivity or clearest state. Incident visible light 326 has reduced absorption and more of it passes through as transmitted light 327-4 having a fourth optical transmission.

Overall, the optical transmissivities of the various states of the embodiment of FIG. 3 may have the following order: fourth optical transmission>second optical transmission, with the first and third optical transmission levels falling in between.

Positive CLC/PC & DC

Figure 4A:
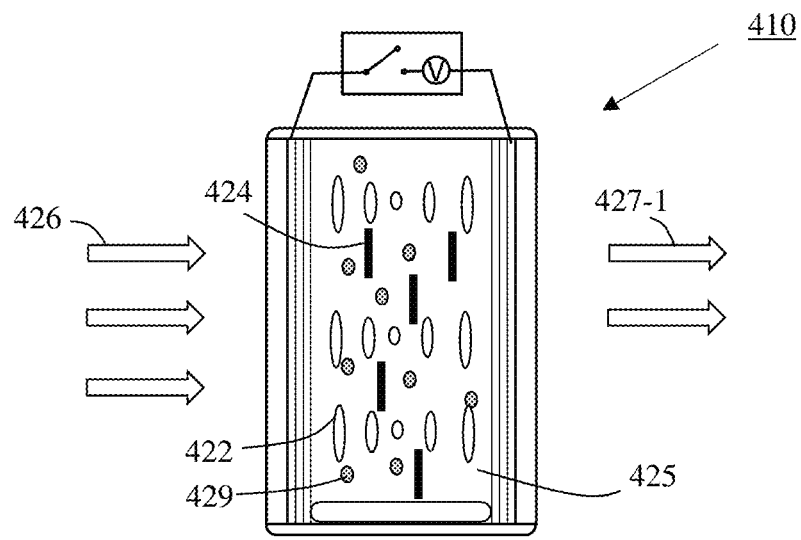
FIGS. 4A-4D are a series of cross-sectional schematics of a non-limiting example of a hybrid VTOD according to some embodiments.

FIGS. 4A-4D are a series of cross-sectional schematics of a non-limiting example of a hybrid VTOD 410 according to some embodiments. Hybrid VTOD 410 may have a guest host mixture 425 including a positive CLC host 422 and a dyestuff material that includes at least one PC dye 429 and at least one DC dye 424. Hybrid VTOD 410 may be similar to the structure shown in FIG. 1. For clarity, various part numbers are not shown, but the parts are self-evident from FIG. 1. FIG. 4A illustrates the hybrid VTOD 410 in a first state where the device is not exposed to UV light nor under a voltage. The DC dye 424 may be generally aligned to the CLC host such that incident visible light 426 is partially absorbed and transmitted light 427-1 has a first optical transmission that is partially attenuated. The transmissivity of the first state may depend on the amount of DC dye present.

Figure 4B:
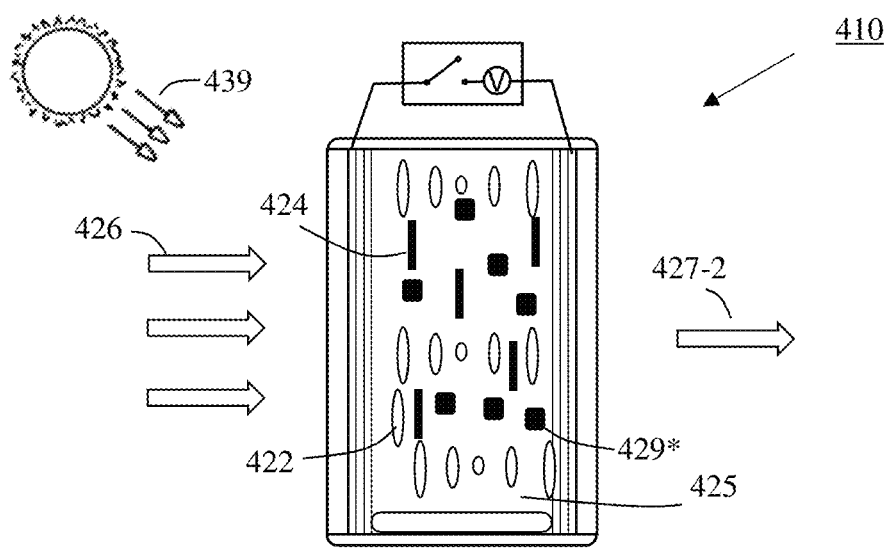

FIG. 4B illustrates the hybrid VTOD in a second state where the device is exposed to UV light 439 but not to a voltage. Under UV radiation, a portion of PC dye 429 is converted to its darkened state, 429*. The combination of DC dye 424 with PC dye 429* may enhance absorption of incident visible light which is passed through as transmitted light 427-2 having a second optical transmission. The second state may generally correspond to the device's minimum transmissivity or darkest state.

Figure 4C:
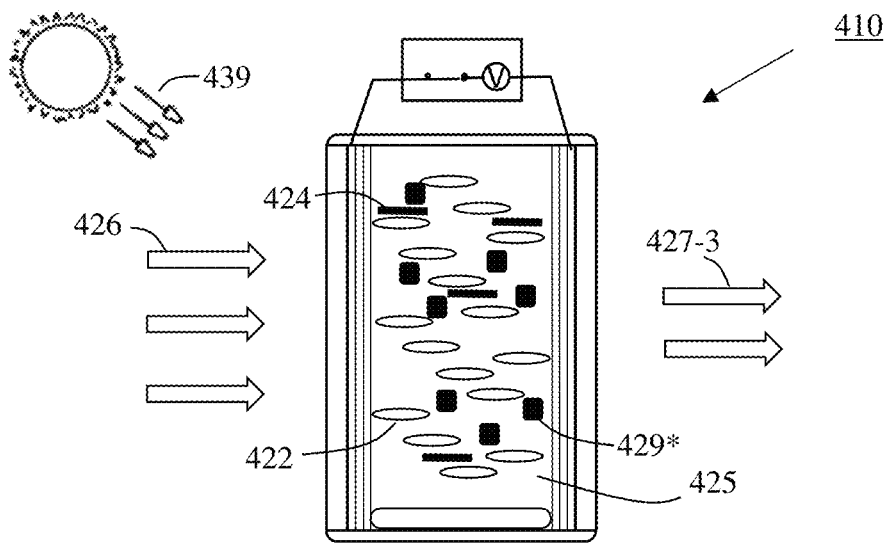

FIG. 4C illustrates the hybrid VTOD in a third state where the device is exposed to UV light 439 and to a voltage above the threshold voltage sufficient to reorient the CLC host 422 and DC dye 424. In this state, the DC dye 424 absorbs less light than in the second state. PC dye 429*, however, is less sensitive to the voltage field and may absorb about the same amount as in the second state, or is at least affected less than DC dye 424 by the application of voltage. The transmitted light 427-3 may have a third optical transmission that is higher than the second state (and may or may not be higher than the first state). By varying the voltage, the transmissivity may be variable between the second and third states. It is understood that the amount of absorption will depend on the applied voltage.

Figure 4D:
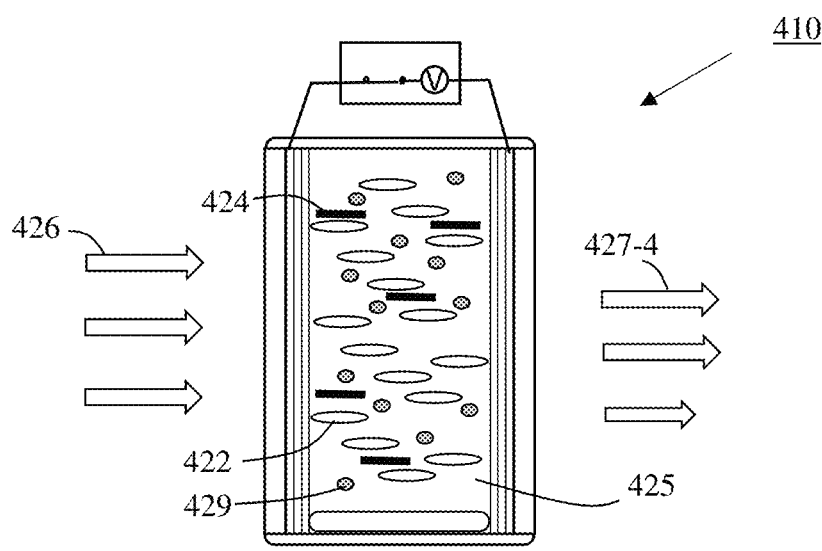

FIG. 4D illustrates the hybrid VTOD in a fourth state where the device is not exposed to UV light, but a voltage is applied above the threshold voltage sufficient to significantly reorient the CLC host 432 and the DC dye 424. In this state, the DC dye 424 absorbs less light than in the first state. In this embodiment, the fourth state may generally correspond to the device's maximum transmissivity or clearest state. Incident visible light 426 is not strongly absorbed and most of it passes through as transmitted light 427-4 having a fourth optical transmission. By varying the voltage, the transmissivity may be variable between the first and fourth states. Overall, the optical transmissivities of the various states of the embodiment of FIG. 4 may have the following order: fourth optical transmission>second optical transmission, with the first and third optical transmission levels falling in between.

Negative CLC/PCDC

Figure 5A:
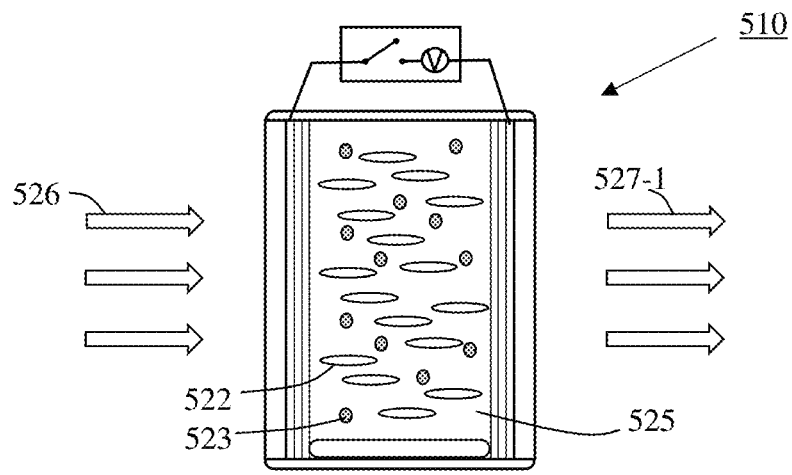
FIGS. 5A-5C are a series of cross-sectional schematics of a non-limiting example of a hybrid VTOD according to some embodiments.
Figure 5B:
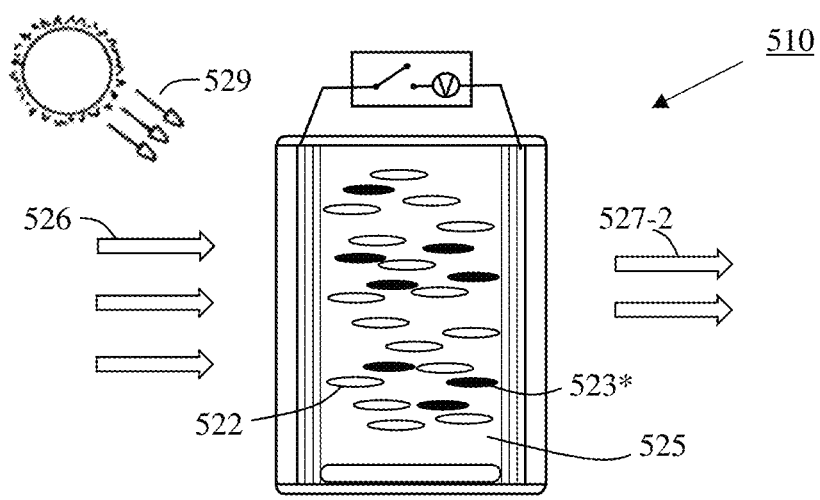
Figure 5C:
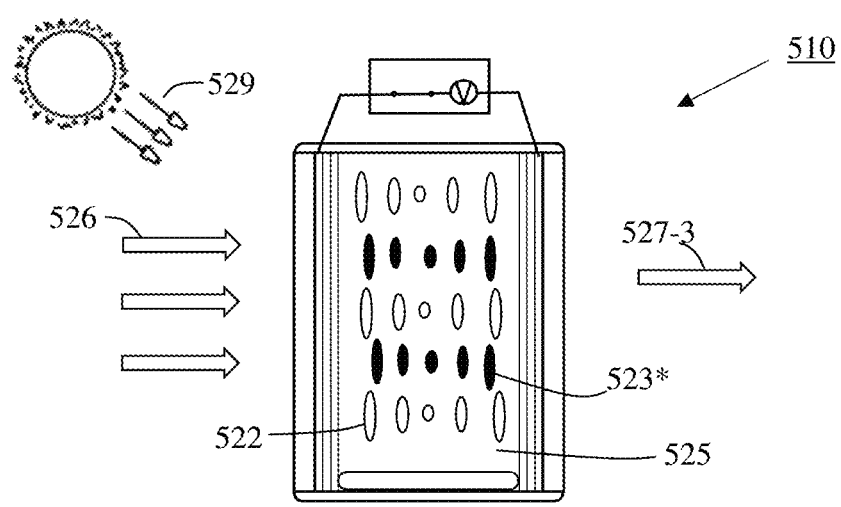

FIGS. 5A-5C are a series of cross-sectional schematics of a non-limiting example of a hybrid VTOD 510 having a guest host mixture 525 including a negative CLC host 522 and a dyestuff material that includes at least one PCDC dye 523 according to some embodiments. Hybrid VTOD 510 may be similar to the structure shown in FIG. 1. For clarity, various part numbers are not shown, but the parts are self-evident from FIG. 1. FIG. 5A illustrates the hybrid VTOD 510 in a first state where the device is not exposed to UV light and nor under a voltage. The first state may generally correspond to the device's maximum transmissivity or clearest state. Incident visible light 526 is not maximally absorbed and passes through as transmitted light 527-1 having a first optical transmission.

FIG. 5B illustrates the hybrid VTOD in a second state where the device is exposed to UV light 529 but not to a voltage. Under UV radiation, a portion of PCDC dye 523 is converted to its darkened state, 523*. However, the general alignment of darkened PCDC dye 523* with the negative CLC host 522 reduces the intensity of light absorption by the PCDC dye 523*. Visible light 526 may be moderately attenuated as transmitted light 527-2 having a second optical transmission.

FIG. 5C illustrates the hybrid VTOD in a third state where the device is exposed to UV light 529 and to a voltage above the threshold voltage sufficient to reorient the CLC host 522 and the PCDC dye 523*. In this state, the PCDC dye 523* absorbs more light than in the second state, and visible light 526 may be attenuated as transmitted light 527-3 having a third optical transmission. The third state may generally correspond to the device's minimum transmissivity or darkest state. By varying the voltage, the transmissivity may be variable between the second and third states. As mentioned, the thermal relaxation of a PCDC dye 523* to its less-absorbing state 523 may take several minutes. However, the reorientation of the CLC host under voltage may in some cases take significantly less time. This property may be particularly useful, for example, where the optical device is a form of eyewear. Outside, the user's eyes receive some protection from bright sunlight without need for any power, but with application of a voltage, stronger protection may be obtained. When coming back inside, the user may switch off the voltage which instantly (e.g., within milliseconds) reduces the darkness of the eyewear to the second state, thereby improving the user's vision.

It is worth noting that in the embodiments of FIG. 5, a potential fourth state may include application of a voltage without exposure to UV light. However, in this embodiment, such a condition will generally not result in a significant optical change because there is no visible light absorbing dye without UV radiation. Overall, the optical transmissivities of the various states of the present embodiment may have the following order: first optical transmission>second optical transmission>third optical transmission.

Negative CLC/PCDC & DC

Figure 6A:
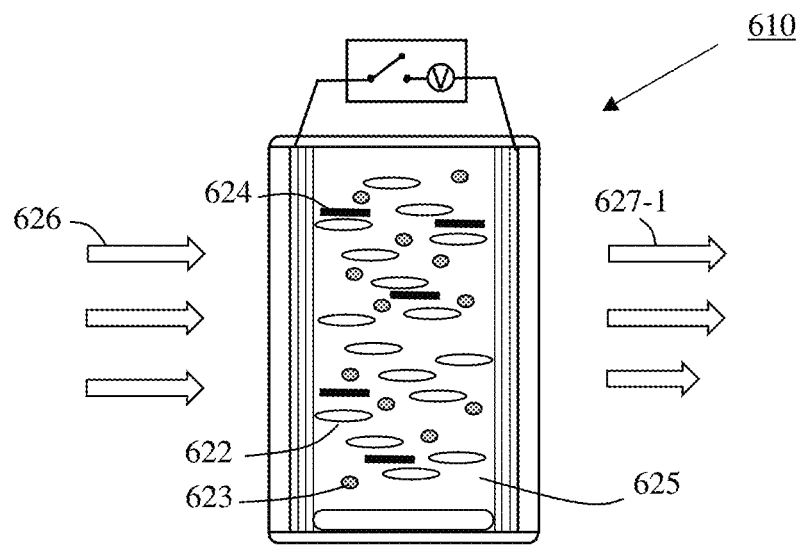
FIGS. 6A-6D are a series of cross-sectional schematics of a non-limiting example of a hybrid VTOD according to some embodiments.

FIGS. 6A-6D are a series of cross-sectional schematics of a non-limiting example of a hybrid VTOD 610 according to some embodiments. Hybrid VTOD 610 may have a guest host mixture 625 including a negative CLC host 622 and a dyestuff material that includes at least one PCDC dye 623 and at least one DC dye 624. Hybrid VTOD 610 may be similar to the structure shown in FIG. 1. For clarity, various part numbers are not shown, but the parts are self-evident from FIG. 1. FIG. 6A illustrates the hybrid VTOD 610 in a first state where the device is not exposed to UV light nor under a voltage. The DC dye 624 may be generally aligned to the CLC host such that incident visible light 626 is not strongly absorbed and transmitted light 627-1 has a first optical transmission that is less attenuated. The transmissivity of the first state may depend on the amount of DC dye present. The first state may generally correspond to the device's maximum transmissivity or clearest state.

Figure 6B:
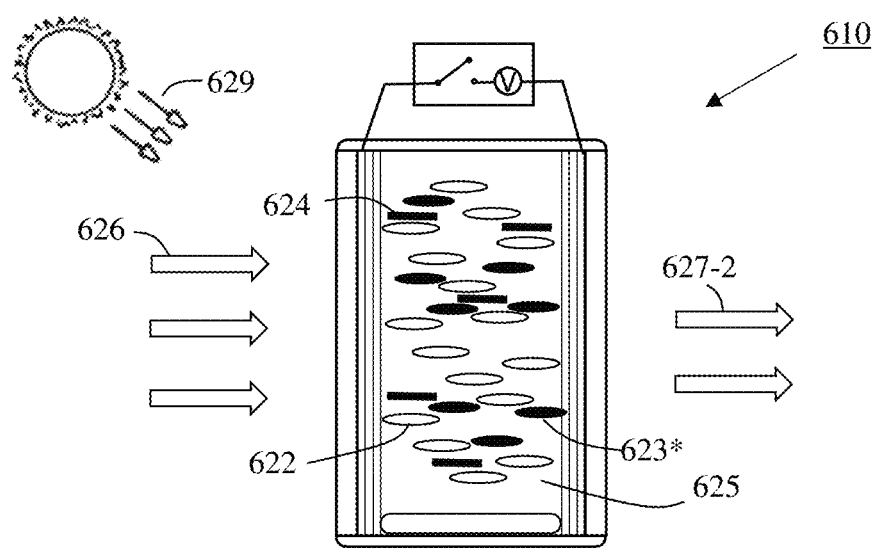

FIG. 6B illustrates the hybrid VTOD in a second state where the device is exposed to UV light 629 but not to a voltage. Under UV radiation, a portion of PCDC dye 623 is converted to its darkened state, 623*. However, the general alignment of darkened PCDC dye 623* with the negative CLC host 622 reduces the intensity of light absorption by the PCDC dye 623*. Visible light 626 may be moderately attenuated as transmitted light 627-2 having a second optical transmission.

Figure 6C:
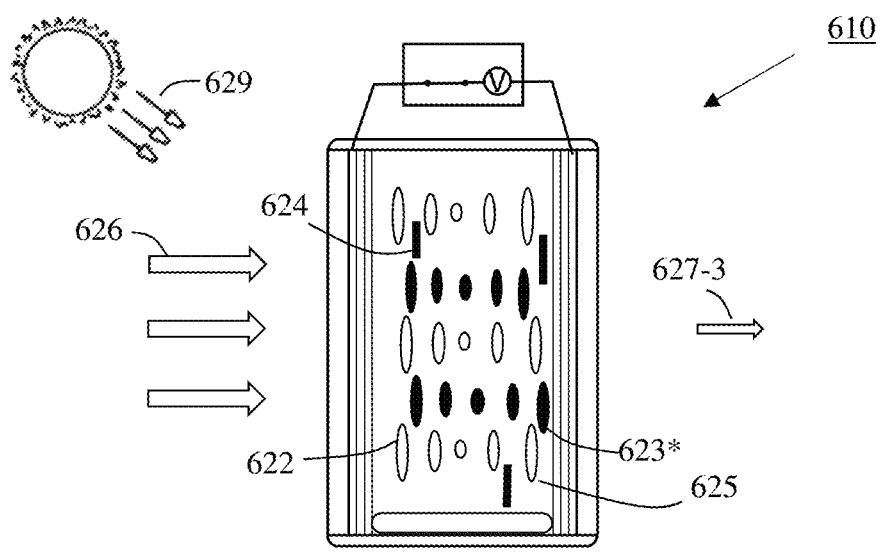

FIG. 6C illustrates the hybrid VTOD in a third state where the device is exposed to UV light 629 and to a voltage above the threshold voltage sufficient to reorient the CLC host 622, the PCDC dye 623*, and DC dye 624. In this state, the PCDC dye 623* and DC dye 624 absorb more light than in the second device state resulting in transmitted light 627-3 having a third optical transmission that is significantly attenuated. The third state may generally correspond to the device's minimum transmissivity or darkest state. By varying the voltage, the transmissivity may be continuously variable between the second and third states.

Figure 6D:
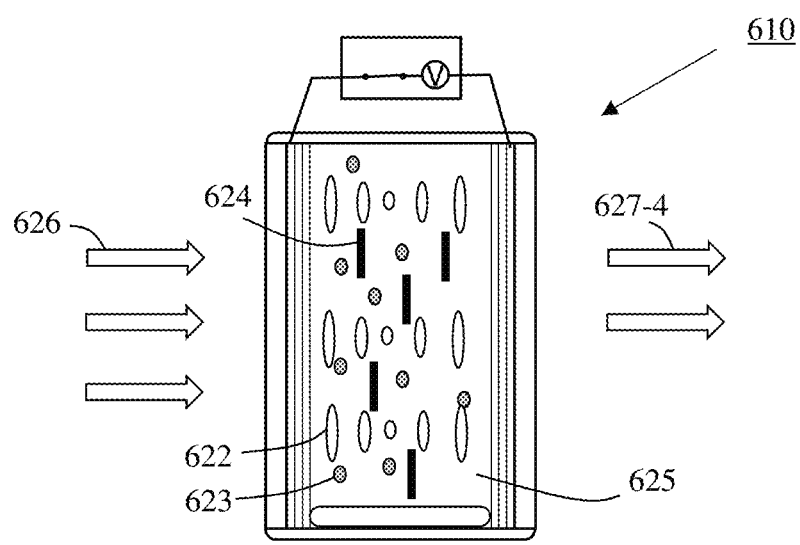

FIG. 6D illustrates the hybrid VTOD in a fourth state where the device is not exposed to UV light, but a voltage is applied above the threshold voltage sufficient to significantly reorient the CLC host 632 and the DC dye 624. In this state, the DC dye 624 absorbs more light than in the first state. Incident visible light 626 may be absorbed such that only a portion of it passes through as transmitted light 627-4 having a fourth optical transmission. By varying the voltage, the transmissivity may be continuously variable between the first and fourth states.

Overall, the optical transmissivities of the various states of the embodiment of FIG. 6 may have the following order: first optical transmission>third optical transmission, with the second and fourth optical transmission levels falling in between.

Negative CLC/PC & DC

Figure 7A:
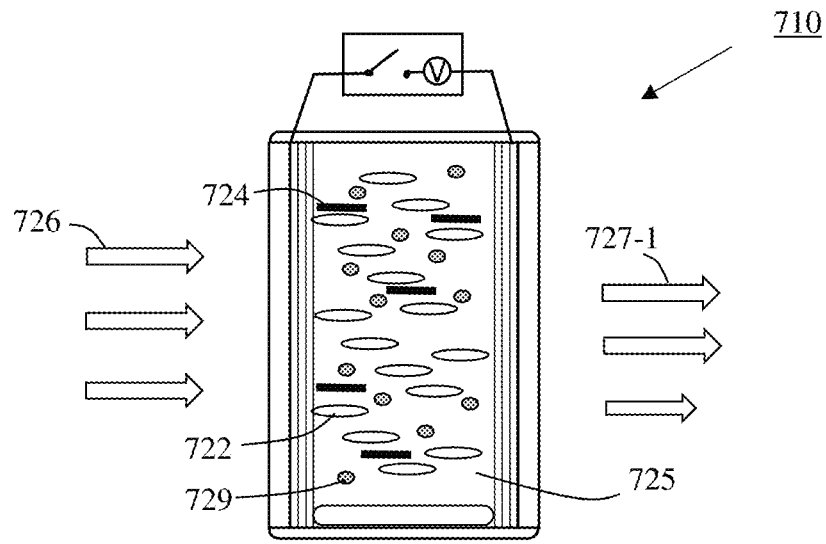
FIGS. 7A-7D are a series of cross-sectional schematics of a non-limiting example of a hybrid VTOD according to some embodiments.

FIGS. 7A-7D are a series of cross-sectional schematics of a non-limiting example of a hybrid VTOD 710 according to some embodiments. Hybrid VTOD 710 may have a guest host mixture 725 including a negative CLC host 722 and a dyestuff material that includes at least one PC dye 729 and at least one DC dye 724. Hybrid VTOD 710 may be similar to the structure shown in FIG. 1. For clarity, various part numbers are not shown, but the parts are self-evident from FIG. 1. FIG. 7A illustrates the hybrid VTOD 710 in a first state where the device is not exposed to UV light nor under a voltage. The DC dye 724 may be generally aligned to the CLC host such that incident visible light 726 is not strongly absorbed and transmitted light 627-1 has a first optical transmission that is less attenuated. The transmissivity of the first state may depend on the amount of DC dye present. The first state may generally correspond to the device's maximum transmissivity or clearest state.

Figure 7B:
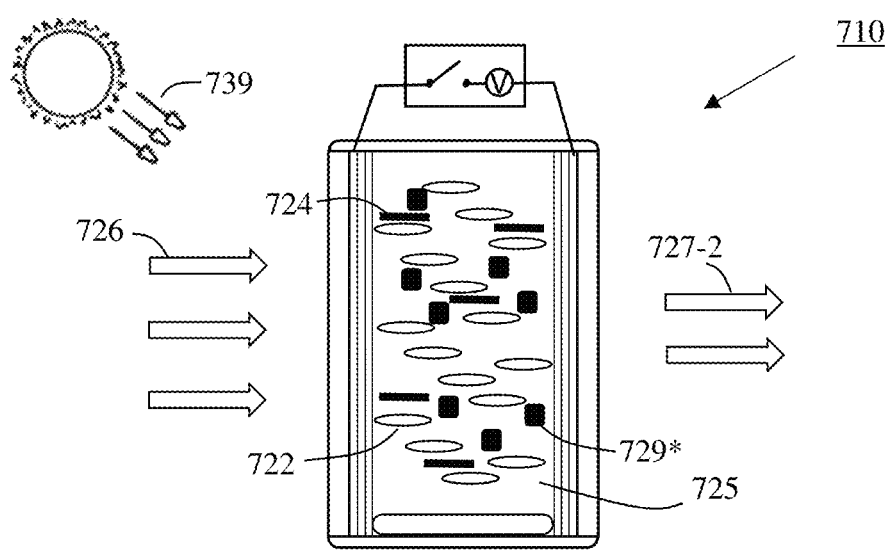

FIG. 7B illustrates the hybrid VTOD in a second state where the device is exposed to UV light 739 but not to a voltage. Under UV radiation, a portion of PC dye 729 is converted to its darkened state, 729*. The combination of DC dye 724 with PC dye 729* may moderately absorb visible light to produce transmitted light 727-2 having a second optical transmission.

Figure 7C:
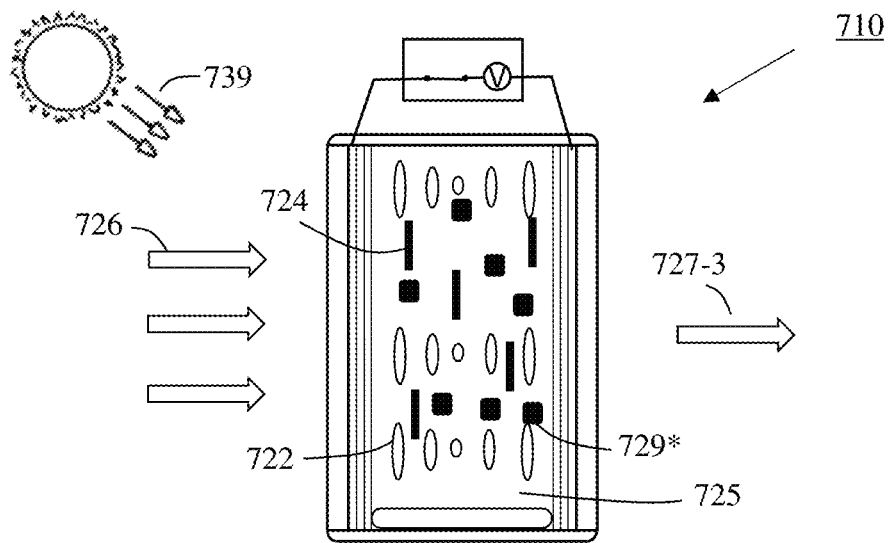

FIG. 7C illustrates the hybrid VTOD in a third state where the device is exposed to UV light 739 and to a voltage above the threshold voltage sufficient to reorient the CLC host 722 and DC dye 724. In this state, the DC dye 724 absorbs more light than in the second state. PC dye 729*, however, is less sensitive to the voltage field and may absorb about the same amount as in the second state, or is at least affected less than DC dye 724 by the application of voltage. The transmitted light 727-3 may have a third optical transmission that is lower than the second state. The third state may generally correspond to the device's minimum transmissivity or darkest state. By varying the voltage, the transmissivity may be continuously variable between the second and third states.

Figure 7D:
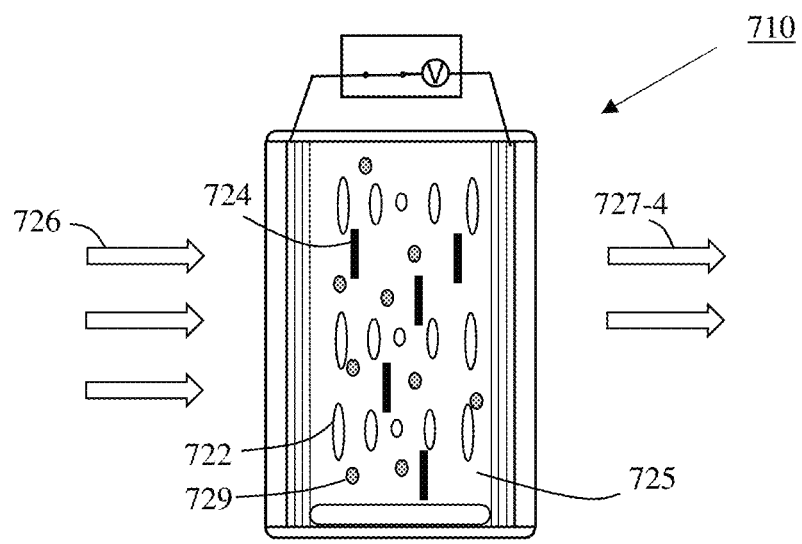

FIG. 7D illustrates the hybrid VTOD in a fourth state where the device is not exposed to UV light, but a voltage is applied above the threshold voltage sufficient to reorient the CLC host 732 and the DC dye 724. In this state, the DC dye 724 absorbs more light than in the first state. Incident visible light 726 may be moderately absorbed to produce transmitted light 727-4 having a fourth optical transmission. By varying the voltage, the transmissivity may be continuously variable between the first and fourth states.

Overall, the optical transmissivities of the various states of the embodiment of FIG. 7 may have the following order: first optical transmission>third optical transmission, with the second and fourth optical transmission levels falling in between.

Note that the drawings of FIGS. 2-7 are idealized with respect to CLC and dye orientation and are simply intended to convey the general operation of these embodiments. Although not shown in the figures, additional embodiments may include dyestuff materials having a mixture of PCDC, PC, and DC with a positive or negative dielectric CLC host.

Multi-Device Variable Transmission Optical Systems

Figure 8A:
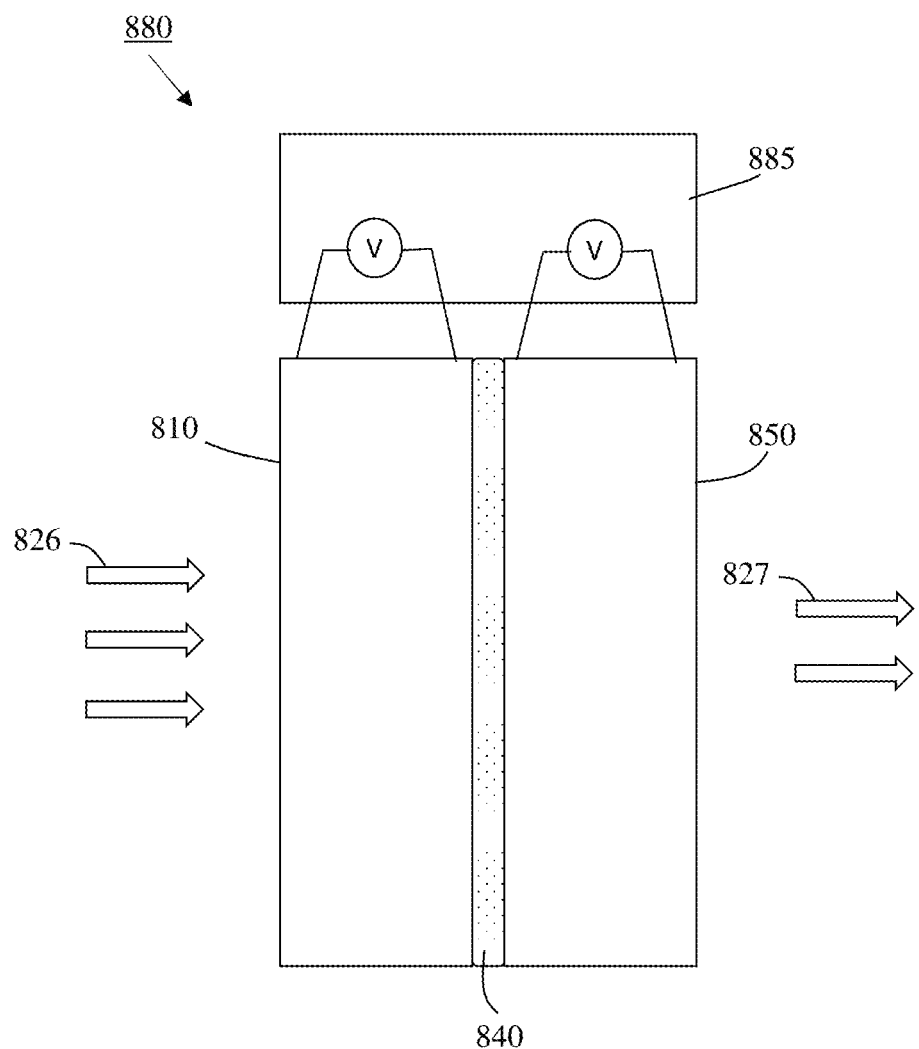
FIG. 8A is a cross-sectional schematic of a non-limiting example of a variable transmission optical system according to some embodiments.

In some embodiments, a hybrid VTOD may be combined with another electro-optic device. FIG. 8A shows a non-limiting example of a variable transmission optical system according to some embodiments. Variable transmission optical system 880 may include a hybrid VTOD 810 (which may be referred to herein as a "first cell") and another electro-optical device 850 (which may be referred to herein as a "second cell") optically coupled to the hybrid VTOD. Hybrid VTOD 810 may include any of the embodiments discussed above. Electro-optical device 850 may, for example, be another hybrid VTOD. In some embodiments, electro-optical device may include an electronic variable transmission optical device similar to ones disclosed in U.S. Pat. No. 9,134,551 published on Sep. 15, 2015, which is incorporated herein by reference for all purposes. In some embodiments, the hybrid VTOD 810 and the electro-optical device 850 may be stacked or arranged so that visible light 826 may pass through both devices such that one or both devices may act on the light to vary the intensity of transmitted light 827. In some cases, the variable transmission optical system may include an optical coupling or index-matching layer 840 between the devices to reduce reflective or other optical losses. Variable transmission optical system 880 may include a single power supply 885 (as shown) to power both devices, or alternatively, each device may have its own dedicated power supply. In some embodiments, a voltage applied to a hybrid VTOD 810 may be the same as that applied to electro-optical device 850. Alternatively, the voltage across each device may be independently controllable (as shown).

Figure 8B:
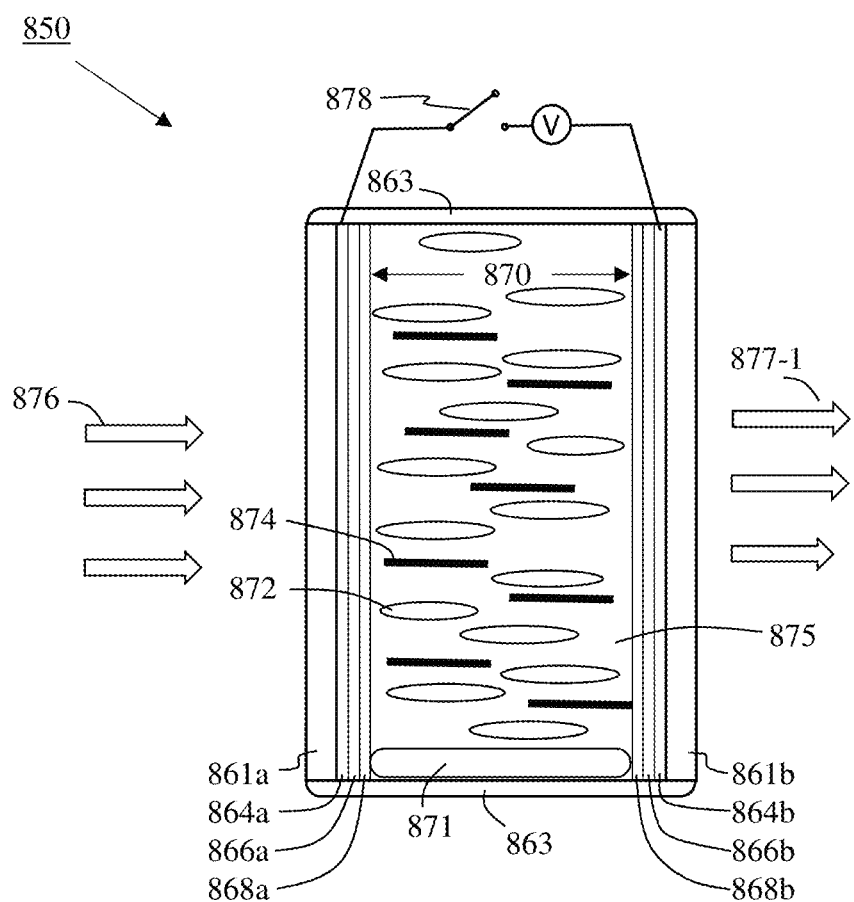
FIG. 8B is a cross-sectional schematic of a non-limiting example of an electro-optical device in a first state according to some embodiments.

FIG. 8B is a non-limiting example of an electro-optical device according to some embodiments. Electro-optical device ("EOD") 850 may have a structure similar to that described in FIG. 1 except with a different liquid crystal guest-host mixture.

In some embodiments, the hybrid electro-optical device 850 may include a pair of substrates, 861a, 861b, separated by a gap defining a cell thickness 870. To aid in maintaining the separation, optional spacers (not shown), such as glass or plastic rods or beads, may be inserted between the substrates 861a and 861b. An optically active liquid crystal guest-host mixture 875 may be disposed between the substrates. The guest-host mixture 875 may, for example, include a negative dielectric liquid crystal host as shown. Alternatively, the host may include a positive dielectric liquid crystal. The guest-host mixture 875 includes one or more DC dyes 874. In some embodiments, the guest-host mixture does not include a PC or PCDC dye. In some cases, the structure may be enclosed by a sealing material 871 (or 863), such as a heat or UV-cured optical adhesive, to form and "end seal" (as known in the art).

Substrates 861a, 861b may include a polymeric material, a glass, or a ceramic. Substrates 861a, 861b may each include transparent conducting layer 864a, 864b provided over the respective substrate. Both conducting layers 864a and 864b may be connected to a power supply that may include a variable voltage supply which is represented schematically by the encircled V. FIG. 8B shows the power circuit with its switch 878 open so that no voltage is applied. When switch 878 is closed, a variable voltage or electric field may be applied across liquid crystal guest-host mixture 875. In some embodiments, an optional passivation layer 866a, 866b, may be provided over the respective conducting layer. The passivation layer may include, for example, a non-conductive oxide, sol-gel, polymer, or a composite. An alignment layer 868a, 868b, may be provided over the passivation layer or the electrically conductive layer. As a non-limiting example, the alignment layer may include polyimide. In some embodiments, the alignment layer may function as a passivation layer. The alignment layer may be the innermost layer of the substrate and may be in contact with the liquid crystal guest host mixture 875. Note that any or all of parts 861*a*, 862*a*, 864*a*, 866*a*, and 868*a* may be the same or different relative to the corresponding parts on the opposite side of the cell 861*b*, 862*b*, 864*b*, 866*b*, and 868*b*.

Figure 8C:
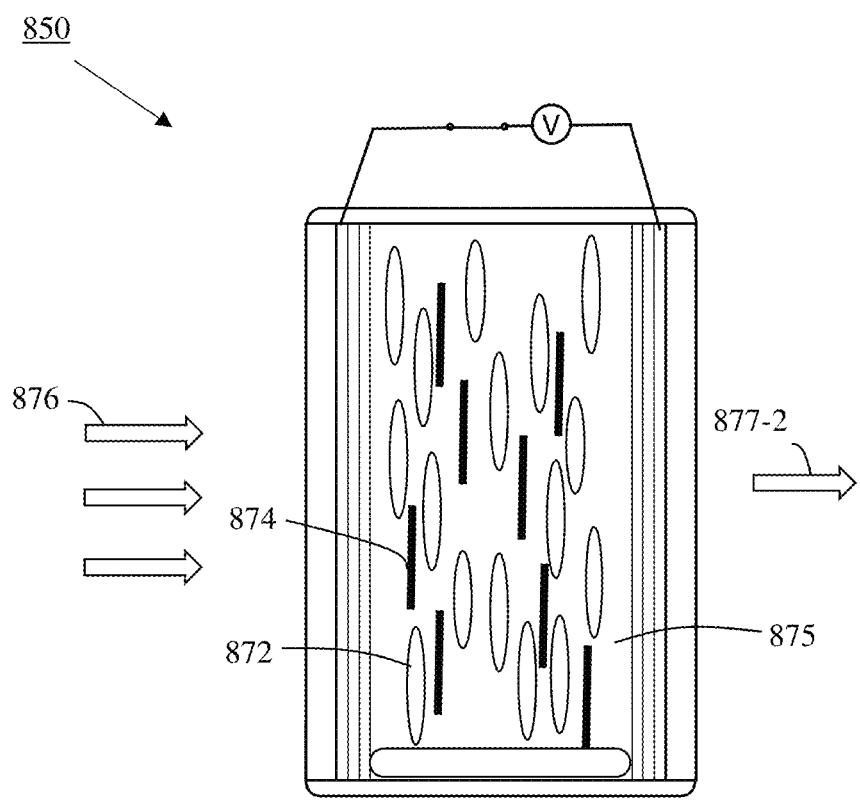
FIG. 8C is a cross-sectional schematic of a non-limiting example of an electro-optical device in a second state according to some embodiments.

As discussed previously, the DC dye 874 may generally align with the liquid crystal host. In operation, the orientation of DC dye 874 is such that it may not absorb a substantial amount of visible light 876 received by EOD 850. The transmitted light 877-1 is not significantly attenuated. The open voltage state (EOD first state) may generally correspond to the maximum transmissivity of EOD 850 or its clearest state, as shown in FIG. 8C, a voltage may be applied above the threshold voltage sufficient to significantly reorient the liquid crystal host 872 and DC dye 874. With such voltage applied (EOD second state), the DC dye 874 absorbs substantially more light than in the open voltage state, and transmitted light 877-2 may have enhanced attenuation. The EOD second state may generally correspond to the minimum transmissivity of EOD 850 or clearest state. By varying the voltage, the transmissivity may be continuously varied between the EOD first and EOD second states. EOD 850 in such embodiments may be characterized as an electronic VTOD.

In some embodiments, variable transmission optical system 880 may be designed so that hybrid VTOD 810 faces or receives a UV light source (e.g., the sun) and the EOD 850 is positioned behind the VTOD with respect to the UV light source.

In some cases, a variable transmission optical system 880 may provide variable light blocking performance that is difficult to achieve with just a hybrid VTOD or an EOD alone, e.g., larger accessible transmission swing values and/or faster adaptability to more environments. The variable transmission optical system 880 may be made from lightweight materials so the combined system is not unwieldy or uncomfortable if used in an application that is worn by a user. In some embodiments, hybrid VTOD and EOD may share a central substrate to further reduce size, weight, or optical losses.

In some embodiments, the clear state transmission of a hybrid VTOD or variable transmission optical system may be equal to or above 35%, 40%, 45%, 50%, 55%, 60%, 65%, 70%, 75%, 80%, 85%, 90%, 95%, 96%, 97%, 08% or 99%. In some embodiments, the dark state transmission of a hybrid VTOD or variable transmission optical system may be equal to or below 55%, 50%, 45%, 40%, 35%, 30%, 25%, 20%, 15% or 10%. The chirality of the host material results in an intrinsic pitch, p, of the liquid crystal host material. The ratio of the cell gap thickness, d, to this pitch is referred to as d/p. It is known in the art that the d/p of the device will determine the eigenmodes of the light propagation. A nematic liquid crystal has a d/p=0. A CLC host liquid crystal as described here has a d/p greater than 0.

For example, for sufficiently low d/p and birefringence, referred to as "In the Mauguin limit", the polarization of the light follows that of the liquid crystal and the propagation eigenmodes are linearly polarized light. Alternatively, devices that are not In the Mauguin limit, light propagation eigenmode utilizes this property to control the degree of polarization sensitivity of the device so it is not In the Mauguin limit. In other words, a CLC host liquid crystal makes the device less polarization sensitive, i.e. less than 90%, 80%, 70%, 60%, 50%, 40%, 30%, 20% or 10% polarization sensitive.

In some embodiments, the hybrid VTOD may have a thickness to pitch ratio (d/p) of greater than 0.01, alternatively, greater than 0.1, 0.2, 0.3, 0.4, or 0.5. In some embodiments, d/p is less than 3.0, or alternatively less than 2 or 1. In some embodiments, d/p may be in a range of 0.1-0.2, 0.2-0.3, 0.3-0.4, 0.4-0.5, 0.5-0.6, 0.6-0.7, 0.7-0.8, 0.8-0.9, or a combination of ranges thereof.

In some embodiments, the hybrid VTOD may have a pair of plastic substrates that have an optical retardation with less than ±20% variation in uniformity across the area of the device, alternatively less than ±15%, or less than ±10%.

In some embodiments, the hybrid VTOD may have a cell with a cell gap in a range of 3 to 5 microns, 5 to 7 microns, 7 to 10 microns, 10 to 15 microns, or 15 to 20 microns, or any combination of ranges thereof.

In some embodiments, the hybrid VTOD or variable transmission optical system may have a transmission swing (the difference between the most transmissive "clear" state and the least transmissive "dark" state) that is greater than or equal to 30%, alternatively greater than 35%, 40%, 45%, 50%, 55%, 60%, 65%, 70%, 75%, or 80%.

In some embodiments, the guest-host mixture has a nematic-isotropic transition temperature TNI greater than 40° C. In other embodiments, the TNI is greater than 45° C., 50° C., 55° C., 60° C., 65° C., 70° ° C., 75° C., 80° C., 85° C. or 90° C. In some embodiments, the hybrid VTOD or variable transmission optical system includes a guest-host mixture with an order parameter, Smix, greater than 0.65, 0.7, 0.71, 0.72, 0.73, 0.74, 0.75, 0.76, 0.77 or 0.78, alternatively greater than or equal to 0.79 or 0.80.

Applications

Hybrid VTOD and variable transmission optical systems have a wide variety of potential uses. For example, these devices may be directly fabricated into or laminated onto "wearable" products such as eyewear (such as prescription and non-prescription glasses and sunglasses), visors, goggles, face shields, near-eye displays, and AR/VR headsets to name a few. Alternatively, they may be directly fabricated into or laminated onto other products including, but not limited to, windows (vehicles, buildings, aircrafts, etc.), windshields, sunroofs, heads-up displays, and optical instruments. Such products and devices may be further equipped with power supplies, batteries, sensors or the like. The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. A variable transmission optical device comprising:
    a first voltage-controlled cell comprising:
        a first pair of substrates each comprising an electrically conductive layer; and
        a first guest-host mixture provided within a cell gap d between the first pair of substrates, the first guest-host mixture comprising a first liquid crystal host and a first dyestuff material comprising one or more dyes, the first dyestuff material having both photochromic and dichroic properties, wherein absorption of visible light by the first dyestuff material is a function of an applied voltage, and wherein the first liquid crystal host is characterized by a pitch p, and a ratio of d/p is greater than 0.01,
    wherein the first cell may be switched between at least three states including:
        a first state having a first optical transmission when the optical device is not exposed to UV radiation and no voltage is applied between the first set of electrodes;
        a second state having a second optical transmission different from the first optical transmission when the optical device is exposed to UV radiation and no voltage is applied between the first set of electrodes; and
        a third state having a third optical transmission different from the first or second optical transmission when the optical device is exposed to UV radiation and a voltage is applied between the first set of electrodes, and wherein the device has a polarization sensitivity of less than 50%.

2. The optical device of claim 1, wherein the first liquid crystal host has a positive type of dielectric anisotropy.

3. The optical device of claim 2, wherein the first dyestuff material comprises at least one photochromic-dichroic dye.

4. The optical device of claim 2, wherein the first optical transmission >third optical transmission>second optical transmission.

5. The optical device of claim 2, wherein the first dyestuff material comprises at least one photochromic dye and at least one dichroic dye.

6. The optical device of claim 5, wherein the first cell may be switched to a fourth state having a fourth optical transmission when the optical device is not exposed to UV radiation and a voltage is applied between the first set of electrodes.

7. The optical device of claim 6, wherein the fourth optical transmission >second optical transmission, and the first and third optical transmissions are between the fourth and second optical transmissions.

8. The optical device of claim 2, wherein the first dyestuff material comprises at least one photochromic-dichroic dye and at least one dichroic dye.

9. The optical device of claim 8, wherein the first dyestuff material further comprises at least one photochromic dye.

10. The optical device of claim 1, wherein the first liquid crystal host is characterized by a negative type of dielectric anisotropy.

11. The optical device of claim 10, wherein the first dyestuff material comprises at least one photochromic-dichroic dye.

12. The optical device of claim 10, wherein the first optical transmission >second optical transmission>third optical transmission.

13. The optical device of claim 10, wherein the first dyestuff material comprises at least one photochromic dye and at least one dichroic dye.

14. The optical device of claim 13, wherein the first cell may be switched to a fourth state having a fourth optical transmission when the optical device is not exposed to UV radiation and a voltage is applied between the first set of electrodes.

15. The optical device of claim 14, wherein the first optical transmission>third optical transmission, and the second and fourth optical transmissions are between the fourth and second optical transmissions.

16. The optical device of claim 10, wherein the first dyestuff material comprises at least one photochromic-dichroic dye and at least one dichroic dye.

17. The optical device of claim 16, wherein the first dyestuff material further comprises at least one photochromic dye.

18. The optical device of claim 1, wherein the first dyestuff material comprises:
    (a) at least one photochromic-dichroic (PCDC) dye;
    (b) a mixture of at least one photochromic (PC) dye and at least one dichroic (DC) dye;
    (c) a mixture of at least one PCDC dye and at least one DC dye;
    (d) a mixture of at least one PCDC dye and at least one PC dye; or
    (e) a mixture of at least one PCDC dye, at least one DC dye, and at least one PC dye.

19. The optical device of claim 1, further comprising:
    a second voltage-controlled cell optically coupled to the first cell, the second cell comprising:
        a second pair of substrates each comprising an electrically conductive layer; and
        a second guest-host mixture provided within a second gap d between the first pair of substrates, the first guest-host mixture comprising a second liquid crystal host and a second dyestuff material comprising at least one or more dichroic dyes, wherein absorption of visible light by the second dyestuff material is a function of an applied voltage,
wherein the second cell may be switched between at least two states including:
a first state having a first optical transmission when no voltage is applied between the second set of electrodes; and
a second state having a second optical transmission different from the first optical transmission when a voltage is applied between the second set of electrodes.

20. The optical device of claim 19, wherein the second liquid crystal host is characterized by a second pitch p, and the second cell has a second d/p ratio of greater than 0.01.

21. The optical device of claim 19, wherein the second dyestuff material further comprises a photochromic dye or a photochromic-dichroic dye.

22. The optical device of claim 1, wherein the device is not In the Mauguin limit.

23. An article of manufacture comprising the optical device of claim 1, wherein the article of manufacture includes eyewear, a visor, goggles, a face shield, an AR/VR headset, a near-eye display, a window, a windshield, a sunroof, a heads-up display or an optical instrument.

* * * * *